E. JACQUEMIN.
PAN AND LID LIFTER.
APPLICATION FILED AUG. 14, 1912.
1,066,114.
Patented July 1, 1913.
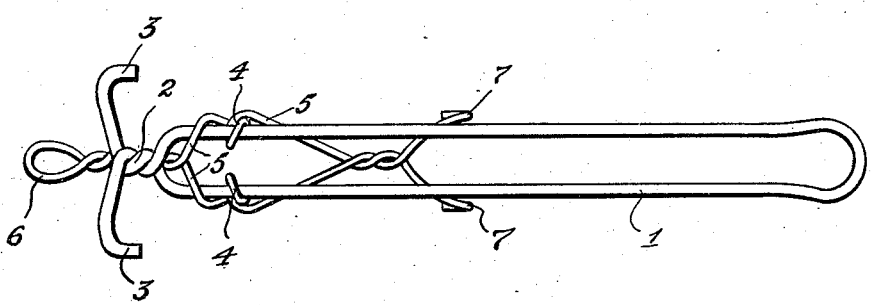
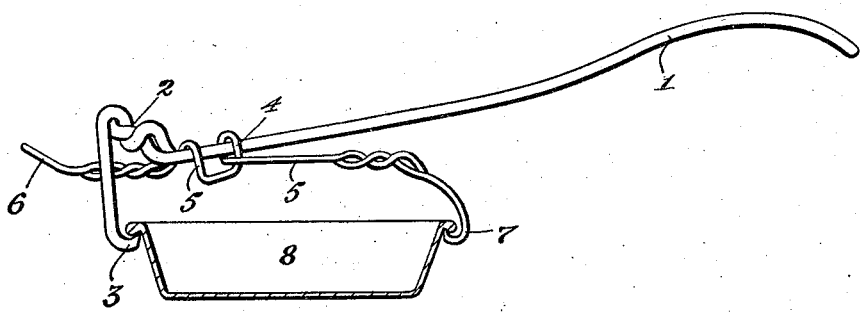

UNITED STATES PATENT OFFICE.

EUGENE JACQUEMIN, OF KENT, WASHINGTON.

PAN AND LID LIFTER.

1,066,114. Specification of Letters Patent. Patented July 1, 1913.

Application filed August 14, 1912. Serial No. 714,992.

*To all whom it may concern:*

Be it known that I, EUGENE JACQUEMIN, a citizen of the United States, and a resident of Kent, in the State of Washington, have invented certain new and useful Improvements in Pan and Lid Lifters, of which the following is a full, true, and exact specification.

The principal object of this invention is to provide a stove lid lifter of simple construction, very cheap to manufacture, strong and durable, and with which is combined self adjusting means for lifting pans, or other articles, of varying dimensions and which have become heated so that it is not convenient to use the bare hands in the handling thereof.

The invention will be fully described in the following specification and shown in the accompanying drawings, in which—

Figure 1 is a plan view of my device. Fig. 2 is a side elevation of the same, with an ordinary cooking pan shown in operative engagement with the device.

Referring now more particularly to the drawings, reference numeral 1 designates a wire formed into an elongated loop, as shown, the approximate ends of which are twisted about each other, as at 2, and the extreme ends, 3, thereof spread outwardly as shown in Fig. 1, and downwardly as best seen in Fig. 2. The looped wire 1, just described, forms the handle portion of the device. Wrapped around the opposite sides of the loop, at 4, is a second wire, 5, which is twisted into the looped nose 6 and has its ends formed into the hooks 7 which are inclined toward the hooks 3, between which and the hooks 7 a pan such as shown at 8 is adapted to be gripped. It will be observed that the extreme ends 7 of the wire 5 are at a greater distance from the loop 4 than is the nose 6, so that when the latter is moved toward the right sufficiently to free it from the wire 1 the hooks 7 will overbalance the nose 6 and cause the latter to rise and project slightly upwardly through the looped handle, and thus form a convenient finger piece whereby the wire 5 may be readily moved along the said handle.

When it is desired to use the implement as a stove lid lifter the parts are moved into the positions shown in the drawings, the nose 6 projecting beneath the twisted ends of the wire 1 and beyond the plane of the hooks 3, so that the said nose may be entered into the ordinary lifting recess of a stove lid, the wire 5 being twisted in the manner shown in the drawings so as to form a relatively long bearing.

While I have shown my device as formed of wire, it will be understood that the same may be cast or some of the parts stamped.

From the foregoing it is believed that my device will be fully understood by others skilled in the art, and, while I have shown and described a particular form of embodiment of my invention, I do not wish to be limited to that exact form, except as indicated by the appended claim.

Having described my invention, what I claim as new and desire to protect by Letters Patent, is—

In an article of the class described the combination of a single wire formed into an elongated loop and having each of its ends twisted around the other and bent downwardly and outwardly to form hooks, a second wire wrapped upon said first mentioned wire so as to slide thereon and also to have a slight pivotal movement with relation thereto, and having its ends spread into hooks which extend below said handle, a nose formed from said second mentioned wire which is adapted to be projected beneath said loop and beyond the first mentioned hooks, and when not so projected to extend above said elongated loop to form a finger piece.

EUGENE JACQUEMIN.

Witnesses:
FRED P. GORIN,
R. D. SMALLEY.

Copies of this patent may be obtained for five cents each, by addressing the "Commissioner of Patents, Washington, D. C."